United States Patent
Meggs et al.

(10) Patent No.: US 6,978,671 B1
(45) Date of Patent: Dec. 27, 2005

(54) GAS TANK GAUGE

(76) Inventors: Daniel Meggs, 3224 Cherum St., Las Vegas, NV (US) 89135; Kenneth Lee, 323 S. Larkwood St., Anaheim, CA (US) 92808

( * ) Notice: Subject to any disclaimer, the term of this patent is extended or adjusted under 35 U.S.C. 154(b) by 0 days.

(21) Appl. No.: 10/745,384

(22) Filed: Dec. 22, 2003

Related U.S. Application Data

(62) Division of application No. 10/241,405, filed on Sep. 10, 2002, now abandoned.

(60) Provisional application No. 60/318,602, filed on Sep. 10, 2001.

(51) Int. Cl.$^7$ .......................... G01F 23/20; G01G 3/02; G01G 3/04
(52) U.S. Cl. .................. 73/149; 73/290 R; 73/296; 73/290 B; 177/180; 177/225; 177/231; 177/233
(58) Field of Search ................... 73/149, 290 B, 73/290 R, 219, 293, 296, 433, 435, 426; 177/130, 131, 145, 146, 180, 225, 229, 231, 177/232, 233, 234

(56) References Cited

U.S. PATENT DOCUMENTS

| | | | | |
|---|---|---|---|---|
| 411,576 A | * | 9/1889 | Brown | 177/130 |
| 478,699 A | * | 7/1892 | Kovsky | 177/231 |
| 2,196,280 A | * | 4/1940 | Thornhill et al. | 177/149 |
| 2,821,854 A | * | 2/1958 | Franke | 73/296 |
| 2,902,271 A | * | 9/1959 | Clevenger et al. | 177/208 |
| 3,319,730 A | * | 5/1967 | Cuddon-Fletcher | 177/233 |
| 3,687,209 A | * | 8/1972 | Goldberg et al. | 177/233 |
| 4,002,215 A | * | 1/1977 | Harvill | 177/146 |
| 4,078,625 A | * | 3/1978 | Loeb | 177/233 |
| 4,245,505 A | * | 1/1981 | Baynes | 73/296 |
| 4,319,651 A | * | 3/1982 | Robichaud | 177/229 |
| 4,382,478 A | * | 5/1983 | Hearn | 177/169 |
| 4,413,515 A | * | 11/1983 | Quinn | 73/296 |
| 4,524,617 A | * | 6/1985 | Krehel et al. | 73/296 |
| 4,677,964 A | * | 7/1987 | Lohmeyer et al. | 126/41 R |
| 4,850,441 A | * | 7/1989 | Mosdal | 177/136 |
| 4,927,038 A | * | 5/1990 | Roebuck | 220/590 |
| 4,964,529 A | * | 10/1990 | Houston | 206/523 |
| 5,056,364 A | * | 10/1991 | Kahler et al. | 73/296 |
| 5,186,159 A | * | 2/1993 | Crow et al. | 126/41 R |
| 5,203,799 A | * | 4/1993 | Wineman | 177/246 |
| 5,396,035 A | * | 3/1995 | Studanski | 177/132 |
| 5,555,764 A | * | 9/1996 | Dybas | 73/296 |
| 5,686,704 A | * | 11/1997 | Simser | 177/167 |
| 5,739,478 A | * | 4/1998 | Zefira | 177/130 |
| 5,850,757 A | * | 12/1998 | Wierenga | 73/296 |
| 5,864,097 A | * | 1/1999 | Alvino | 177/232 |
| 6,012,411 A | * | 1/2000 | Hochbrueckner | 116/207 |

(Continued)

FOREIGN PATENT DOCUMENTS

JP 60058519 A * 4/1985 ........... G01F 23/20

OTHER PUBLICATIONS

"Pro Scale—Propane Tank Scale Gauge" to The BBQ Depot, available on the internet at <http://www.thebbqdepot.com>.*

*Primary Examiner*—Hezron Williams
*Assistant Examiner*—David A. Rogers

(57) ABSTRACT

A device for measuring and indicating the volume of the contents of a tank includes a fixed base. A spring deflectable with to the base is also provided. The spring supports at least a portion of the tank weight. A visible connector is connected to the spring such that movement of the visible indicator is coupled to movement of the spring. Thus, as the deflection in the spring changes with an increase or decrease in the tank weight, the indicator moves to reflect the change in tank weight.

7 Claims, 9 Drawing Sheets

U.S. PATENT DOCUMENTS

| | | | |
|---|---|---|---|
| 6,124,554 A * | 9/2000 | Muckle et al. | 177/126 |
| 6,148,668 A * | 11/2000 | Sieg | 73/296 |
| 6,284,987 B1 * | 9/2001 | Al-Modiny | 177/170 |
| 6,410,864 B1 * | 6/2002 | Kim | 177/148 |
| 6,541,713 B2 * | 4/2003 | White | 177/25.16 |
| 2001/0032504 A1 * | 10/2001 | Moseley | 73/290 R |

* cited by examiner

Tank Empty

Tank Full

Tank Empty  Tank Full

Tank Empty      Tank Full

GAS TANK GAUGE

RELATED APPLICATION DATA

The present application is a divisional of U.S. patent application Ser. No. 10/241,405, entitled "Gas Tank Gauge," filed Sep. 10, 2002, now abandoned which, in turn, claimed the priority of U.S. Provisional Application Ser. No. 60/318,602, entitled "Device to Support, and Provide Indication of the Gas Contents of, a Propane or Similar Gas Tank," filed Sep. 10, 2001 by Applicants herein.

FIELD OF THE INVENTION

The present invention relates to gauges. More specifically, the present invention relates to a gauge that indirectly measures and indicates the volume of the contents of a tank by measuring the tank weight.

BACKGROUND OF THE INVENTION

Many appliances operate using liquid or gas fuel. For example, many home grills operate using liquified propane stored in pressurized tanks. A problem arises, however, because the tanks are often opaque containers. Thus, the volume stored in the tank cannot be visually discerned. While some appliances using such tanks include a pressure gauge, many do not. Thus, in a conventional appliance, there is typically no readily discernable way to determine the volume of the contents of the tank.

A number of inventions have been created to address this problem. Most use a method and device in which a spring is biased against a tilted tank. As the tank empties, the weight decreases and the spring causes the tank to tilt in the opposite direction.

One drawback of this type of system is that no indicator is given and the user is expected to understand the significance of the tilted tank. Also, this type of system is prone to inaccurate readings if the pivot around which the tank tilts sticks or otherwise cannot rotate freely. Additionally, the amount of tilt may inaccurately reflect the quantity contained in the tank if the tank is improperly positioned on the system because the amount of tilt will depend on the length of the moment arm around the pivot.

SUMMARY OF THE INVENTION

The present invention measures and indicates the volume of the contents of a tank. By way of definition, "tank weight" as used herein refers to the weight of the tank plus the weight of the contents of the tank. The device includes a fixed base. It should be noted that the base may be fixed by resting on a horizontal surface or by mounting it to a horizontal or vertical surface. For example, it is contemplated that the base may rest on a ground surface, be mounted to a wall or gas appliance support, or the like. Optionally, the base cooperates with a cover to enclose the tank. The base may further include rollers, optionally retractable rollers, and a handle. Also provided is a spring deflectable with respect to the base. The spring supports at least a portion of the tank weight. Optionally, the spring supports the entire tank weight. In one embodiment, the base is mounted to a wall surface and the spring supports and suspends the tank. While the tank may rest directly on the spring, a cradle attached to the spring may be provided to support and receive the tank. A visible indicator is connected to the spring such that the indicator moves in some fashion with respect to the fixed base when the spring deflects under the tank weight. The indicator moves between a first position, in which the spring is at a first deflection under a first tank weight when the tank holds a first volume of contents, and a second position, in which the spring is at a second deflection under a second tank weight less than the first tank weight when the tank holds a second volume of contents. In other words, as the tank weight changes, the deflection of the spring changes thereby changing the position of the visible indicator. Optionally, the movement is continuous in that the change in the tank weight may be monitored by a change in indicator position.

For example, in one optional embodiment, the indicator is a band slidably received into the base. The movement of the band is coupled to, and parallel with, the movement of the spring. Thus, the band is received into the base, and thereby at least partially obscured from view by the base, when the spring is at a first deflection under a first tank weight when the tank holds a first volume of contents. Alternatively, the band is raised from inside the base by the spring, and thereby visible, when the spring is at a second deflection under a second tank weight less than the first tank weight when the tank holds a second volume of contents less than the first volume of contents. In other words, as the tank weight changes, the deflection of the spring changes thereby exposing a continuously increasing (or in an alternate embodiment, decreasing) portion of the band.

In another optional embodiment, the base includes a diagonal slot therethrough. As above, the indicator is a band slidably received into the base. In this optional embodiment, however, the band is visible through the slot. As the spring deflects under the tank weight, movement of the band causes the band to either appear increasingly or decreasingly visible through the slot or appear to move across the slot from a first position to a second position.

In yet another optional embodiment, the base includes a slot and the indicator is a pin protruding through the slot. Movement of the pin is coupled to the movement of the spring such that the pin moves between a first position and a second position in the slot when the spring deflected under the tank weight. Thus, the tank weight is indicated by the position of the pin in the slot.

In another optional embodiment, the spring is an leaf spring having two ends, a fixed first end and a second end. In such an embodiment, the indicator is a pivotable pointer, the pointer connected to the second end of the leaf spring such that movement of the pointer is coupled to the movement of the leaf spring. As the spring is deflected by the tank weight, the pointer pivots between a first position and a second position.

DESCRIPTION

Reference is now made to the figures wherein like parts are referred to by like numerals throughout. Referring generally to FIGS. 1–13 the present invention is a support for a tank 10 that measures and indicates the volume of the contents of the tank 10.

The tank 10 used in the present invention may be any tank 10 known in the art. The typical tank 10 is metal and includes a valve regulating the release of pressurized tank contents. For the purposes of this invention, the term "tank weight" as used herein refers to the weight of the tank 10 plus the weight of the tank contents.

Figure 12:
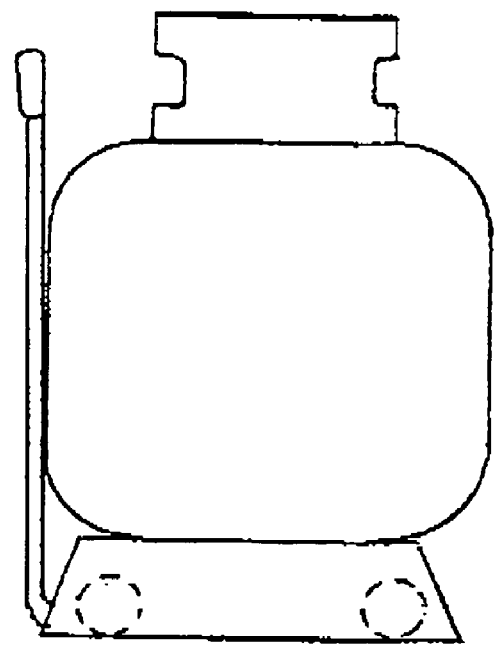
FIG. 12 is a side view of a tank resting on a base with retracted rollers according to the present invention.
Figure 13:
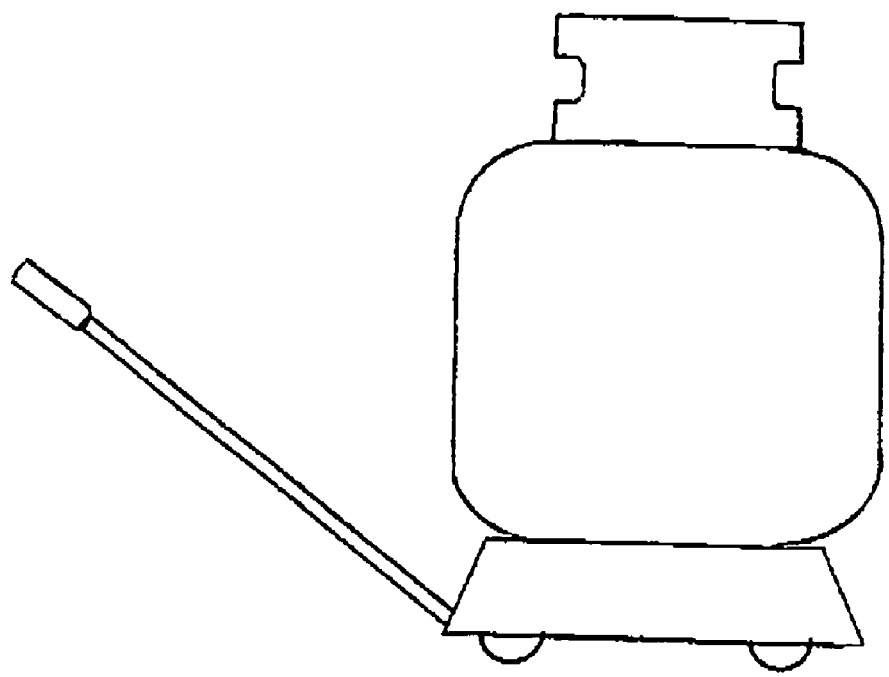
FIG. 13 is a side view of a tank resting on a base with extended rollers according to the present invention.
Figure 14:
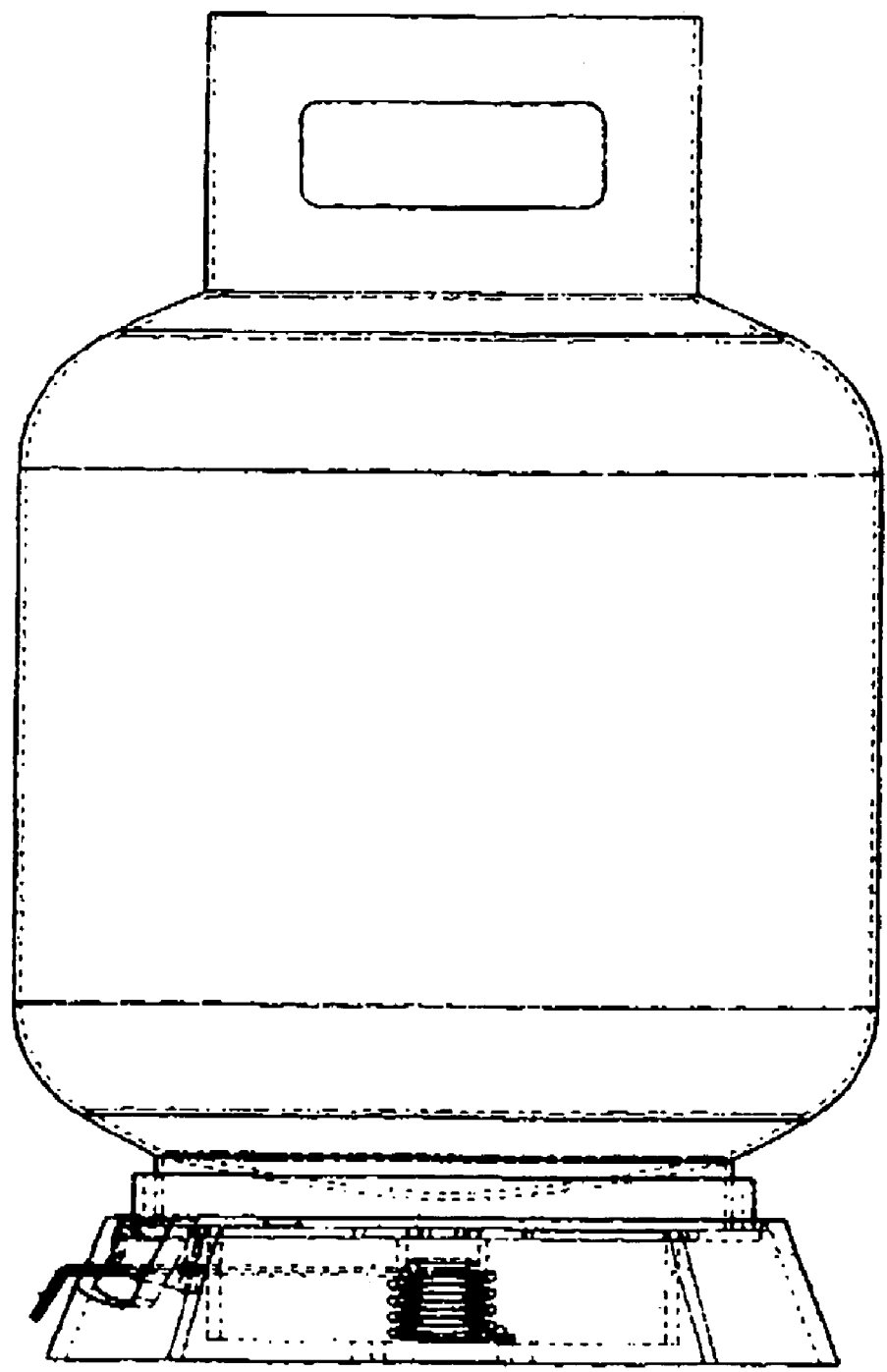
FIG. 14 is a side view of a tank resting on a device according to an embodiment of the present invention.

The device of the present invention includes a base 12. The base 12 is fixed in some fashion, such as, for example, by resting on a horizontal surface or by mounting it to a horizontal or vertical surface. For example, in one optional embodiment, shown in FIGS. 1–8, the base 12 rests on a horizontal surface such as the ground, a shelf, or the like. In such an optional embodiment, the base 12 is a ring. As shown in FIG. 8, the base 12 optionally cooperates with a tank cover 18 to enclose the tank 10. Such a base 12 may also optionally include rollers 20, such as wheels or casters. As shown in FIGS. 12 and 13, the rollers 20 may be retractable. In the optional embodiment of FIGS. 12 and 13, a retracting handle 22 may actuate extension and retraction of the rollers 20.

Figure 9:
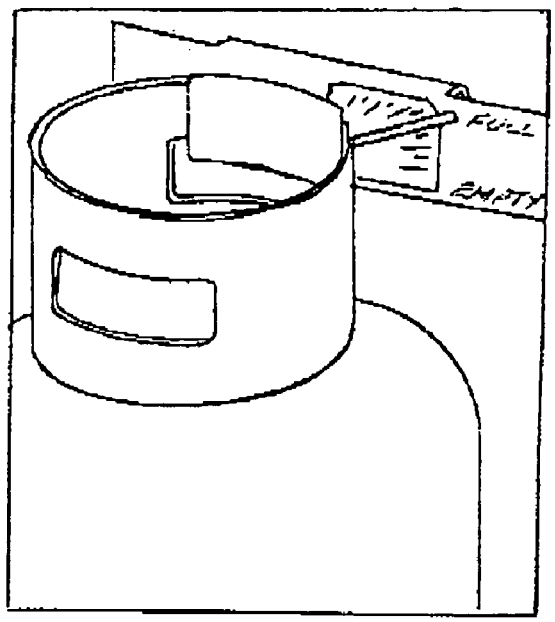
FIG. 9 is elevated perspective view of an empty tank resting on a device according to an embodiment of the present invention.
Figure 10:
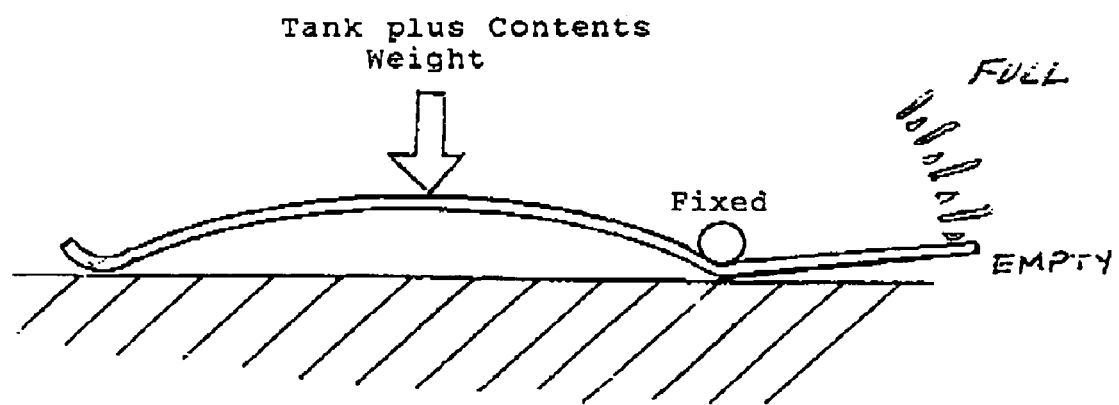
FIG. 10 is a cutaway side view along line A—A of FIG. 9 of an empty tank resting on a device according to the embodiment of FIG. 9.
Figure 11:
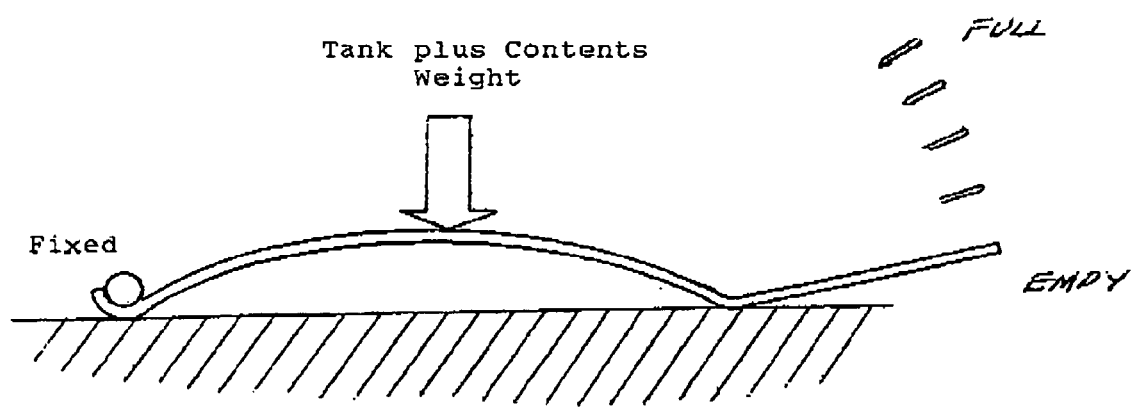
FIG. 11 is a cutaway side view along line A—A of FIG. 9 of a full tank resting on a device according to the embodiment of FIG. 9.

Alternatively, in an alternate embodiment, shown in FIGS. 9–11, the base 12 is mounted to a vertical surface such as a wall 14, gas appliance or appliance support, or the like. In such an embodiment, the base 12 is a cantilevered surface such as an L-shaped or U-shaped bracket 24.

Figure 3:
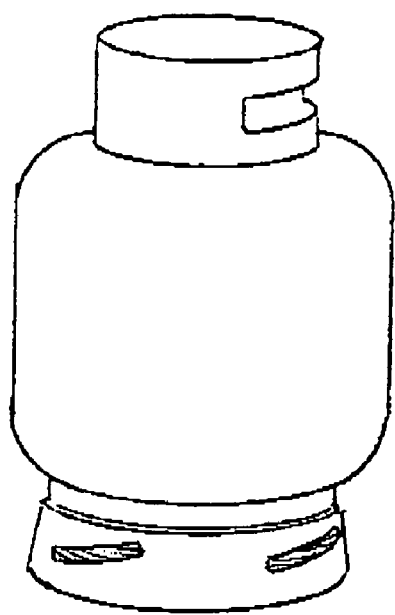
FIG. 3 is an elevated perspective view of an empty tank resting on a device according to an embodiment of the present invention.
Figure 4:
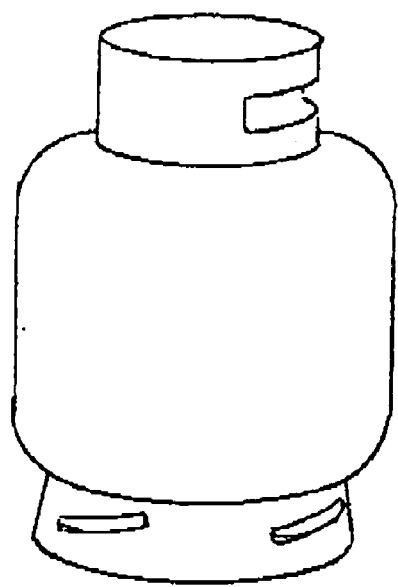
FIG. 4 is an elevated perspective view of a full tank resting on a device according the embodiment of FIG. 3.
Figure 5:
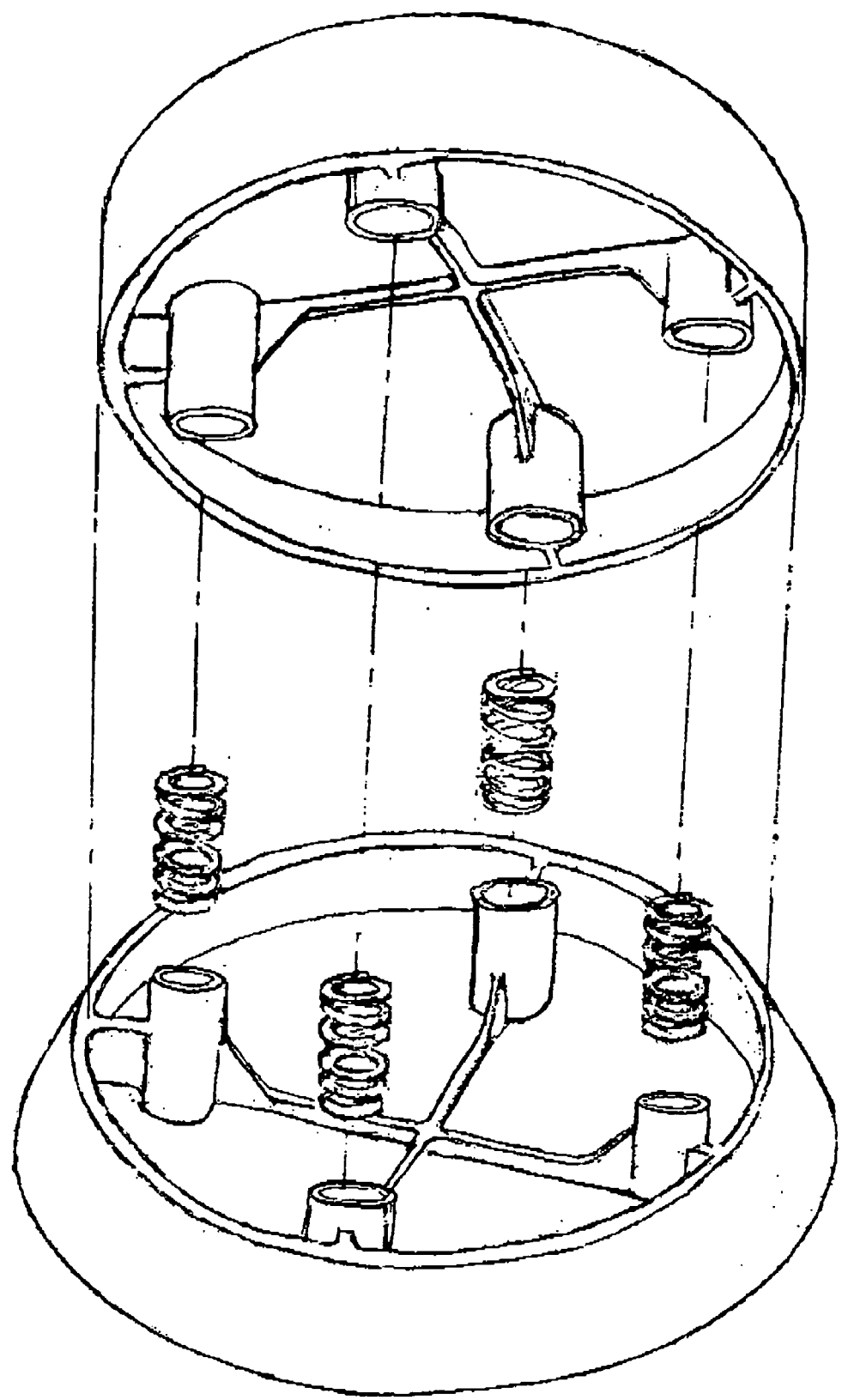
FIG. 5 is an assembly view of a base according to the embodiment of FIG. 3.

Referring generally to FIGS. 1–11, a spring 26 is also provided. The spring 26 is deflectable with respect to the base 12. The spring 26 may be a coil spring, a leaf spring 28, or any other spring. The spring 26 supports at least a portion of the tank weight. Optionally, the spring 26 is positioned under the tank 10 and supports the entire tank weight. It should be noted that one or more springs 26 could be provided. For example, as shown in FIG. 5, four springs 26 are provided.

Referring to FIGS. 1–8, the spring 26 is a coil spring located vertically under a tank 10. While the tank 10 could rest directly on the spring 26, a cradle 30 is provided that receives and supports the tank 10. The spring 26 is a compression spring biased to resist the weight of the tank 10.

Turning to FIGS. 9–11, the spring is a leaf spring 28 mounted to the base 12. The leaf spring 28 includes two ends, one of which is fixed. The arc of the leaf spring 28 is biased to resist, and thereby supports, the weight of the tank 10.

Referring generally to FIGS. 1–11, the device further includes a visible indicator connected to the spring 26. The visible indicator moves with the spring 26 as the spring 26 deflects with respect to the base 12 under the tank weight. That is, when the spring 26 is at a first deflection under a first tank weight when the tank 10 holds a first volume, the indicator is at a first position. Similarly, when the spring 26 is at a second deflection under a second tank weight less than the first tank weight when the tank 10 holds a second volume less than the first volume, the indicator is at a second position. That is, the indicator visibly illustrates the volume of the tank 10 based on deflection in the spring 26 caused by the weight of the tank 10. Optionally, the movement of the indicator is continuous in that as the tank 10 increases or decreases in weight, the indicator moves to indicate the change.

Figure 1:
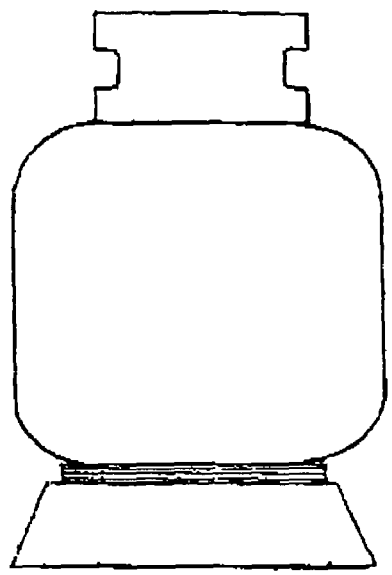
FIG. 1 is an elevated perspective view of an empty tank resting on a device according to an embodiment of the present invention.
Figure 2:
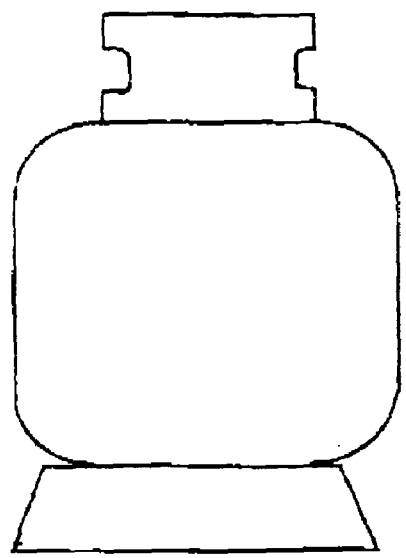
FIG. 2 is an elevated perspective view of a full tank resting on a device according the embodiment of FIG. 1.

More specifically, as shown in FIGS. 1 and 2, in one optional embodiment, the indicator is a band 34 coupled to the movement of the spring 26. The band 34 moves parallel with the movement of the spring 26 and is slidably received into the base 12. As illustrated in FIG. 1, when the tank 10 is empty, the spring 26 raises the band 34 from inside the base 12 so that the band 34 is visible. Alternatively, when the tank 10 is not empty as shown in FIG. 2, the spring 26 is deflected and the band 34 is received into the base 12 so that the band 34 is at least partially, if not fully, obscured by the base 12 from view. In other words, as the tank weight decreases from the state shown in FIG. 2 to the state shown in FIG. 1, an increasing (or in an alternate embodiment, decreasing) amount of the band 34 is visible.

In yet another optional embodiment, shown in FIGS. 3–5, the indicator is again a band 34. However, in this optional embodiment, as shown in FIG. 5, the base 12 includes a diagonal slot 36 through which the band 34 is visible. Again, movement of the band 34 is coupled to the deflection of the spring 26. As above, an empty tank 10, illustrated in FIG. 3 is indicated by the band 34 being raised by the spring 26 to be visible though the slot 36. Alternatively, as shown in FIG. 4, a tank 10 that is not empty deflects the spring 26 and thereby partially, if not fully, obscures the band 34 from view through the slot 36. Thus, as the tank weight decreases, the deflection of the spring 26 decreases and movement of the band 34 into the base 12 causes the band 34 to either appear increasingly or decreasingly visible through the slot 36 or appear to move from a first position to a second position in the slot 36.

Figure 6:
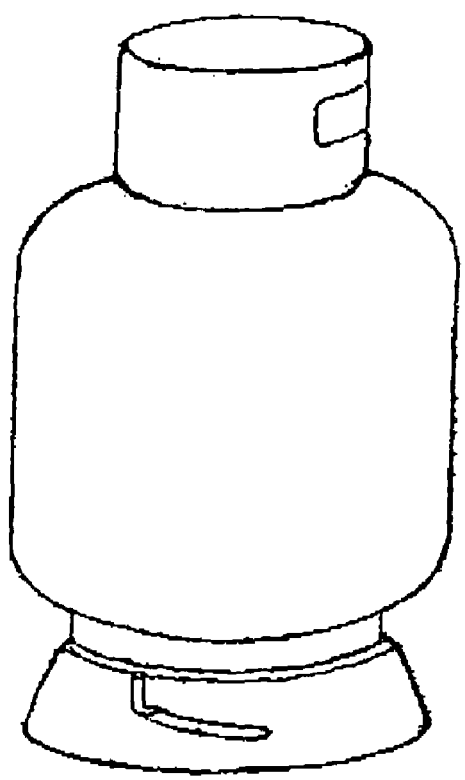
FIG. 6 is an elevated perspective view of an empty tank resting on a device according to an embodiment of the present invention.
Figure 7:
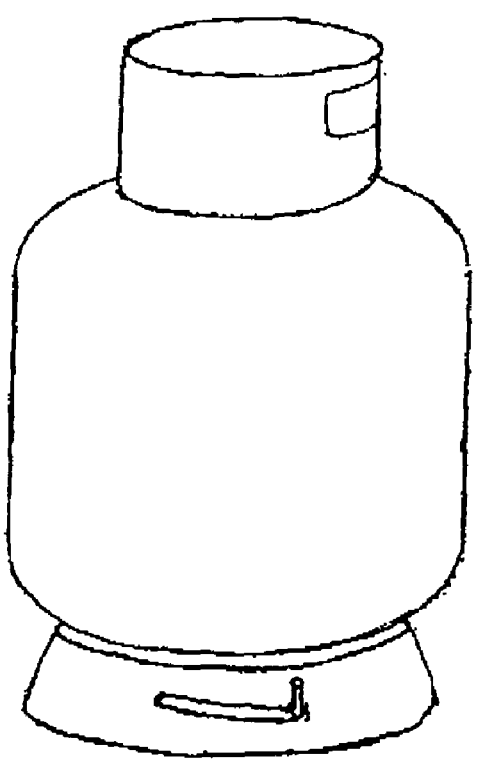
FIG. 7 is an elevated perspective view of a full tank resting on a device according the embodiment of FIG. 6.
Figure 8:
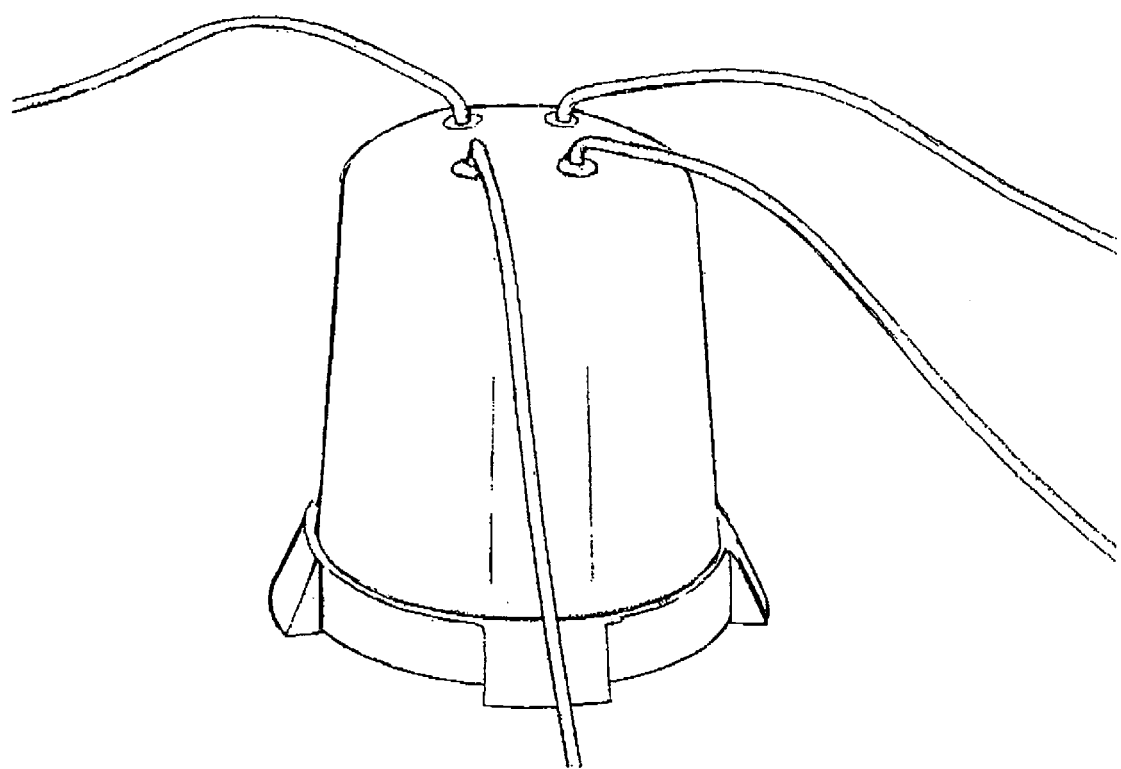
FIG. 8 is an elevated perspective view of a tank cover according to an embodiment of the present invention.

In another optional embodiment, shown in FIGS. 6 and 7, the base 12 includes a slot 36. However, in this embodiment, a pin 38 protrudes through the slot 36. The pin 38 is coupled to movement of the spring 26. The compression of the spring 26, as well as the tendency of a coil spring to twist as the coils are compressed and expanded, causes the pin 38 to move within the slot 36. Thus, as the tank weight decreases, the deflection of the spring 26 decreases thereby permitting the pin 38 to move from a first position, shown in FIG. 7, to a second position, shown in FIG. 6.

Turning to FIGS. 9–11, in yet another optional embodiment, the spring is a leaf spring 28. As described above, the arc of the leaf spring 28 supports the tank weight. Optionally, the tank 10 is suspended from the arc of the leaf spring 28. The leaf spring 28 has two ends, a first end that is fixed and a second end. The indicator is a pivotable pointer 40 connected to the second end such that movement of the pointer 40 is coupled to deflection in the leaf spring 28. As the weight of the tank decreases, deflection of the leaf spring 28 decreases and the pointer 40 pivots from a first position, shown in FIG. 10, to a second position, shown in FIG. 11.

While certain embodiments of the present invention have been shown and described it is to be understood that the present invention is subject to many modifications and changes without departing from the spirit and scope of the claims presented herein.

We claim:

1. A device for measuring and indicating the volume of the contents of a tank having a tank weight equal to the weight of the tank plus the weight of the contents of the tank, comprising:
   a fixed base;
   a spring deflectable with respect to said base, said spring supporting at least a portion of the tank weight;
   a band slidably received into said base, the movement of said band coupled to, and parallel with, the deflection of said spring;
   a diagonal slot in said base through which said band is visible such that said band is visible in a first position through said slot when the spring is at a first deflection under a first tank weight when the tank holds a first volume of contents, and visible in a second position through said slot when the spring is at a second deflection under a second tank weight less than said first tank weight when said tank holds a second volume of contents less than said first volume of contents; and
   a pin coupled to said spring and protruding through said slot.

2. The device of claim 1 further comprising a cradle attached to said spring, said cradle receiving the tank.

3. A device for measuring and indicating the volume of the contents of a tank having a tank weight equal to the weight of the tank plus the weight of the contents of the tank, comprising:
   a fixed base;
   one or more springs deflectable with respect to said base, said one or more springs located vertically beneath said tank such that said one or more springs supports the entire tank weight;
   a band slidably received into said base, the movement of said band coupled to, and parallel with, the defection of said one or more springs such that said band moves continuously with respect to said fixed base when said one or more springs deflect under the tank weight, said band movable continuously between a first position in which the one or more springs are at a first deflection under a first tank weight when said tank holds a first volume of contents, and a second position in which the one or more springs are at a second deflection under a second tank weight less than said first tank weight when said tank holds a second volume of contents less than said first volume of contents;
   a diagonal slot in said base through which said band is visible; and
   a pin coupled to said spring and protruding through said slot.

4. The device of claim 3 further comprising a cradle attached to said one or more springs, said cradle receiving the tank.

5. The device of claim 1 or 3 further comprising a tank cover cooperating with said base to contain said tank.

6. The device of claim 1 or 3 wherein said base includes rollers mounted thereon.

7. The device of claim 6 wherein said rollers are retractable into said base.

* * * * *